J. NEWMANN.
ROLLER BEARING.
APPLICATION FILED JAN. 18, 1911.
1,001,673.
Patented Aug. 29, 1911.
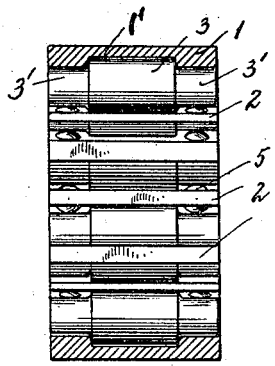
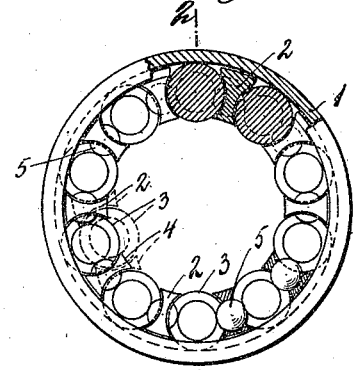
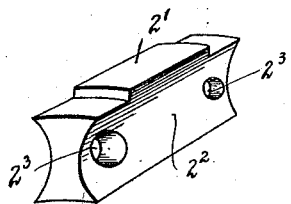
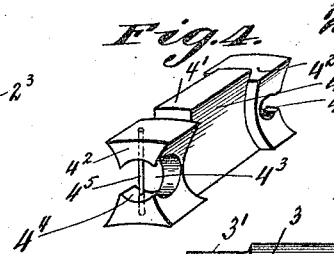
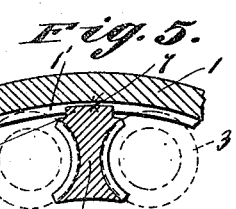
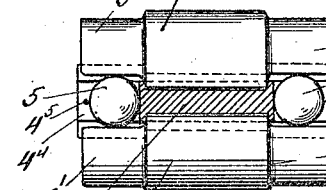
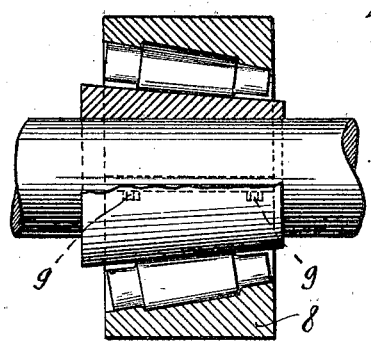
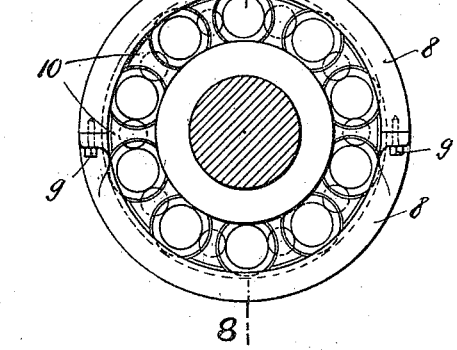
Witnesses:
Henry C. Heebig
R. Brockman
Inventor
John Newmann
By his Attorney
Max D. Ordmann

UNITED STATES PATENT OFFICE.

JOHN NEWMANN, OF BROOKLYN, NEW YORK.

ROLLER-BEARING.

1,001,673.

Specification of Letters Patent. Patented Aug. 29, 1911.

Application filed January 18, 1911. Serial No. 603,226. REISSUED

*To all whom it may concern:*

Be it known that I, JOHN NEWMANN, a citizen of the United States of America, residing at Brooklyn, in the county of Kings and State of New York, have invented certain new and useful Improvements in Roller-Bearings, of which the following is a specification.

The present invention relates to roller bearings of the kind described in my Letters Patent 969,763, and more particularly in my applications Ser. Nos. 566,476 and 586,930, and has for its object to further improve the same, with the view of more simplifying the same and of rendering the manufacture of such bearings cheaper.

With this object in view, my invention consists of the construction, arrangement and combination of parts as will hereinafter be more fully specified.

In the accompanying drawing, which forms a part of this specification, similar reference numerals denote corresponding parts and Figure 1 is an end view partly broken away; Fig. 2 is a longitudinal section on line 2—2 of Fig. 1 of a cylindrical roller bearing; Fig. 3 is a perspective view of one of the loose blocks interposed between the rollers; Fig. 4 is a perspective view of a loose end block; Fig. 5 is a partial cross section in enlarged view, showing the end block in position; Fig. 6 is a cross section through one of the loose blocks showing the position of the rollers and balls relative thereto and Figs. 7 and 8 are an end view and vertical section on line 8—8 of Fig. 7 respectively of a tapered roller bearing slightly modified in construction.

The roller bearing substantially is constructed on the same principle as that underlying my prior application, Ser. No. 566,476, *i. e.* it is composed of a casing or box, rollers, loose blocks interposed between the rollers and balls borne in said loose blocks and projecting laterally outward toward the rollers.

When the box 1 is made of an integral piece, some difficulties have been experienced in assembling the parts, to wit, the blocks, rollers and balls, so as to interlock them with one another. In my application Ser. No. 566,476, I provide in one of the end blocks, apart from the cross bore holding a ball, also a radial bore through which the latter may be subsequently inserted. But this mode of construction has been found in many instances not to be entirely satisfactory. In my new roller bearing, the blocks 2 substantially are constructed in the same manner as in the above named prior application, except that each block is formed on its outer circumference with an outwardly projecting central shoulder or extension 2' of a suitable length. The lateral surfaces of these blocks and shoulders are concaved as at $2^2$ and there are cross bores $2^3$ at the ends of the blocks to receive balls 5 which laterally project from within the said bores. The inner circumference of the box 1 is provided with a central annular groove 1' the width of which may be slightly larger than the length of the central shoulder 2' of the blocks, and which is adapted to loosely engage the said shoulders. The rollers are each formed with a central enlarged portion 3 and reduced ends 3', the central enlarged portion 3 being of a length corresponding to that of the width of the said annular groove 1' of the box, so as to engage therewith and roll therein.

One of the end blocks is slightly modified in construction from the others. Such end block 4, which also has an outer extension 4' is in the center, at both sides and at the length of the shoulder reduced in its thickness by milling, so that the parts $4^2$ of the block extending beyond the shoulder, project from the concaved side surfaces of said central portion in form of shoulders. The central enlarged portion 3 of the rollers is adapted to engage between the said end portions of the end block when the parts are all assembled. The end portions $4^2$ have cross bores $4^3$ as the other blocks, but in addition thereto bores $4^4$ made longitudinally of the blocks and terminating into said cross bores $4^3$. These longitudinal bores $4^4$ permit of the insertion of the balls into the cross bores of the last block after all the parts are assembled in the box, so as to finally lock them in position relative to one another. To prevent the slipping out of the balls from the cross bores $4^3$ through the bores $4^4$ pins $4^5$ or the like may be driven through said end bores $4^4$ to clog the same.

In assembled position, the outer surfaces of the extensions 2' do not bear against the surface of the central annular groove 1', as indicated at 7 (Fig. 5), allowing thus of sufficient play for said parts.

After all parts but the last roller and last block are assembled in the box in the manner described in my prior application, Ser. No. 566,476, the last inserted block 2 is slightly drawn inward (as indicated by dotted lines in Fig. 1) then the last locking block 4 and last roller having been separately assembled are placed in position relative to this slightly displaced block 2 and all three members are forced into position through the still open space (as indicated by dotted lines in Fig. 1). Owing to the reduction in the thickness of the central portion of the last block, the placing into position of these last three members is facilitated. The balls are thereupon inserted through the end bores $4^4$ of said last block and the said bores clogged by the pins $4^5$ to prevent the slipping out of said balls. By the introduction of the balls into the last block, all the parts become efficiently interlocked. The annular groove in the box prevents a lateral displacement of the blocks and rollers. The balls projecting sidewise from the blocks bear against the reduced ends of the rollers.

The same construction may be used for tapered roller bearings. However, in the example shown, the tapered bearing is shown as having a sectional box 8, i. e. a cage constructed of two halves, which in a suitable manner, as by bolts 9 or the like are secured to one another. When the box is made sectional for a cylindrical or tapered roller bearing, there is no necessity for a specially formed end block. In this case, all blocks 10 may be made of uniform shape and conforming to the blocks 2 in the first example, as the members can be first assembled in one and then in the other half of the box and the two halves then assembled and joined.

Having thus described the nature of my invention, what I claim and desire to secure by Letters Patent is:

1. In a roller bearing of the character described, individual loose blocks, each having an outer extension, the lateral surfaces of the blocks and the extensions being concaved.

2. In a roller bearing of the character described, a box having on its inner circumference an annular groove, rollers adapted to bear in said groove and loose blocks interposed between said rollers, each block having an outer shoulder adapted to bear in said groove, the lateral surfaces of said blocks and the shoulder thereof being concaved.

3. In a roller bearing of the character described, a box having on its inner circumference an annular groove, rollers, each having an enlarged portion bearing in said groove, loose perforated blocks interposed between said rollers, each block having an outer shoulder adapted to bear in said groove, the lateral surfaces of said blocks and the shoulders thereof being concaved, and balls in the perforations of said blocks projecting laterally outward and bearing against the reduced ends of said rollers.

4. In a roller bearing of the character described, a block having cross bores and longitudinal bores terminating into the latter.

5. In a roller bearing of the character described, a block having an outer shoulder and a portion reduced in thickness, the lateral surfaces of said block and the shoulder thereof being concaved.

6. In a roller bearing of the character described, a sectional box having on its inner circumference an annular groove, rollers having enlarged portions bearing in said groove, loose blocks interposed between said rollers, each block having an outer shoulder bearing in said annular groove, the lateral surfaces of said blocks and the shoulder thereof being concaved, and balls in the perforations of said blocks projecting laterally outward and bearing against the reduced portions of said rollers.

In testimony whereof I affix my signature in presence of two witnesses.

JOHN NEWMANN.

Witnesses:
JOHN T. CARMODY,
MAX D. ORDMANN.

---

Copies of this patent may be obtained for five cents each, by addressing the "Commissioner of Patents, Washington, D. C."